US 6,737,838 B2

(12) United States Patent
Sluijs et al.

(10) Patent No.: US 6,737,838 B2
(45) Date of Patent: May 18, 2004

(54) DC/DC UP/DOWN CONVERTER

(75) Inventors: Ferdinand Jacob Sluijs, Eindhoven (NL); Cornelis Maria Hart, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 177 days.

(21) Appl. No.: 10/056,469

(22) Filed: Jan. 17, 2002

(65) Prior Publication Data

US 2002/0113580 A1 Aug. 22, 2002

(30) Foreign Application Priority Data

Jan. 18, 2001 (EP) ............................................. 01200169

(51) Int. Cl.[7] .................... G05F 1/613; G05F 1/24; G05F 1/577
(52) U.S. Cl. .................... 323/225; 323/259; 323/267
(58) Field of Search ................. 323/222, 223, 323/225, 247, 259, 267, 268, 271, 344, 351, 284, 285, 290

(56) References Cited

U.S. PATENT DOCUMENTS

| 4,967,138 A | * | 10/1990 | Obergfell et al. ........... 323/224 |
| 5,161,097 A | * | 11/1992 | Ikeda ........................... 363/124 |
| 5,216,351 A | * | 6/1993 | Shimoda ...................... 323/224 |
| 5,552,694 A | * | 9/1996 | Appeltans .................... 323/222 |
| 5,977,753 A |   | 11/1999 | Edwards et al. ............. 323/222 |
| 6,191,567 B1 | * | 2/2001 | Sluijs ........................... 323/259 |

FOREIGN PATENT DOCUMENTS

WO 9534121 A1 12/1995

OTHER PUBLICATIONS

D. Vargha et al, "Add 12–V Output to 5–V Buck Regulator", Electronic Design, Penton Publishing, Cleveland, OH, US, vol. 41, No. 7, Apr. 1, 1993, p. 54 XP000359440.

* cited by examiner

Primary Examiner—Jessica Han
(74) Attorney, Agent, or Firm—Aaron Waxler

(57) ABSTRACT

A DC/DC up/down converter (30), comprising inductive energy storage means (L), switching means (S1, S2, S3) and control means (40). The control means (40) are arranged for operatively controlling the switching means (S1, S2, S3) for transferring electrical energy to a first output (Vout1) of the DC/DC converter (30) in a down-conversion mode and for transferring electrical energy from the first output (Vout1) to a second output (Vout2) of the DC/DC converter (30) in an up-conversion mode.

7 Claims, 2 Drawing Sheets

DC/DC UP/DOWN CONVERTER

The invention relates to a DC/DC up/down converter, comprising inductive energy storage means, switching means and control means, wherein the control means are arranged for selectively operating the switching means for transferring an amount of electrical energy from the energy storage means to an output of said DC/DC converter.

A DC/DC up/down converter of this type is known from International patent application WO 95/34121 in the name of applicant.

In practice, compared to DC/DC up converters, an up/down converter usually requires two extra switching means for realizing the up/down function. This has three major disadvantages. Firstly, in that more chip area is required for integrated circuit DC/DC converters; secondly, in that the series resistance of the circuit as a whole is increased, and thirdly in that higher switching losses occur, in particular in the case of semiconductors switches.

The invention has for its object to propose a DC/DC up/down converter overcoming these disadvantages.

This object is solved, by the present invention, in a DC/DC up/down converter, the control means of which are configured for operatively controlling the switching means of the DC/DC converter for transferring electrical energy to a first output of the DC/DC converter in a down-conversion mode and for transferring electrical energy from the first output to a second output of the DC/DC converter in an up-conversion mode.

In accordance with the present invention two outputs are realized. A first output operated in a down-conversion mode and a second output operated in an upconversion mode. The second output voltage is provided in a two-step conversion cycle wherein energy from the first output is transferred to the second output.

In a preferred embodiment of the invention the DC/DC up/down converter according to the invention comprises:

first and second input terminals;

first and second output terminals;

third and fourth output terminals;

a coil, having first and second connection ends, wherein the second connection end connects to the first output terminal;

first switching means operatively connected to provide a conduction path from the first connection end of the coil to the second input terminal;

second switching means operatively connected to provide a conduction path from the first connection end of the coil to the third output terminal;

third switching means operatively connected to provide a conduction path from the first input terminal to the first connection end of the coil;

first diode means parallel connected to the first switching means, and providing a conduction path from the fourth output terminal to the first connection end of the coil;

second diode means parallel connected to the second switching means, and providing a conduction path from the first connection end of the coil to the second output terminal, and control means arranged for operatively switching the first, second and third switching means into their closed or conductive state and open or non-conductive state.

Compared with the prior art, the DC/DC up/down converter according to the present invention can be realized with one switch less, thereby saving chip area in the case of an integrated circuit converter and reducing switching losses and output series resistance due to the non-zero resistance of the conduction path of the switching means, in particular in the case of semiconductor switching means.

In the preferred embodiment of the DC/DC up/down converter according to the invention, the control means are arranged for controlling the switching means in a conversion cycle comprising seven different phases:

a first phase wherein the third switching means are in a conductive state and the first and second switching means are in a non-conductive state;

a second phase wherein the first switching means are in a conductive state and the second and third switching means are in a non-conductive state;

a third phase wherein the first switching means are in a conductive state and the second and third switching means are in a non-conductive state;

a fourth phase wherein the second switching means are in a conductive state and the first and third switching means are in a non-conductive state, and wherein current flow in the coil is in opposite direction compared to the second phase;

fifth phase wherein the first, second and third switches are in a nonconductive state;

a sixth phase wherein the first, second and third switches are in a nonconductive state and current flow in the coil is in opposite direction compared to the fifth phase, and a seventh phase wherein the first, second and third switches are in a nonconductive state and wherein no current flows through the coil.

Preferably, switching means constructed as MOS (Metallic Oxide Semiconductor) transistor means are used, having their control terminal (gate) connected to the control means for controlling the conductive or non-conductive state of the transistors.

Preferably, the DC/DC up/down converter according to the invention comprises smoothing capacitors connected across the output terminals of the first and second output.

The invention further relates to a power supply comprising a DC/DC up/down converter as disclosed above, and arranged for receiving a DC input voltage Vin at its input, and wherein the control means are arranged for transferring an amount of electrical energy from the input to the energy storage means, such that during use the first output of the DC/DC converter provides a voltage Vout1 and the second output of the DC/DC converter provides a voltage Vout2, wherein Vout1<Vin and Vout2>Vout1.

The DC/DC converter according to the invention is of particular advantage if applied in a portable electronic appliance, such as, but not limited to, battery powered appliances.

The invention will now be described in more detail with reference to the accompanying drawings, wherein:

FIG. 1 shows a basic circuit of a prior art DC/DC up-converter 1 having a single output.

Figure 1:
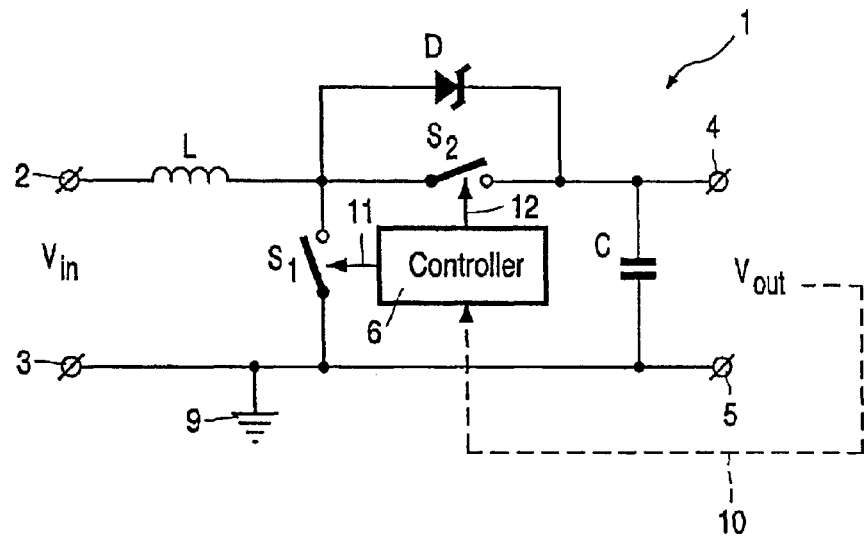
FIG. 1 shows a circuit diagram of a prior art DC/DC up-converter.

The converter 1 comprises inductive energy storage means taking the form of a coil L having a first and a second connection end. The first connection end of the coil L connects to a first input terminal 2 and the second connection end of the coil L connects by first switching means S1 to a second input terminal 3. Further, the second connection end of the coil L connects by second switching means S2 to a first output terminal 4. A diode D is parallel connected with the second switching means S2, providing a conduction path in forward direction of the diode D from the second connection end of the coil L to the first output terminal 4. A smoothing capacitor C connects to the first output terminal 4 and a second output terminal 5. The second input terminal 3 and the second output terminal 5 connect through a common conductive path, for example the earth or mass 9 of an electronic appliance.

The converter 1 is operated to provide a controlled or regulated output voltage Vout at the output terminals 4, 5 in response to an input voltage Vin at the input terminals 2, 3. To this end, a controller or control means 6 are provided for operating the switching means S1 and S2 in accordance with a PFM (Pulse Frequency Modulation) and/or a PWM (Pulse Width Modulation) control scheme, wherein the output voltage Vout is higher than the input voltage Vin. The control of the switching means S1 and S2 is schematically indicated by arrows 11, 12. Measurement of the output voltage Vout by the control means 6 is schematically indicated by a dashed arrow 10.

In a typical PFM mode of operation, in a first phase, the switching means S1 are closed, that is in a current conductive state, and the switching means S2 are open, that is in a non-current conductive state. During this first phase, current flows only through the coil L storing electrical energy therein.

During a second phase, subsequent to the first phase, the switching means S1 are open and the switching means S2 are closed. In this phase, energy built up in the coil L is provided at the output terminals 4, 5 resulting in an output voltage Vout which is higher than the input voltage Vin.

A new switching cycle is started once the measured output voltage Vout drops below a set reference voltage, controlled by the control means 6.

In the PWM mode, the coil current I does not become zero. Likewise, during a first phase energy is stored or built up in the coil L, whereas in a subsequent second phase of the PWM switching cycle the stored energy is delivered to the output terminals 4, 5 of the converter 1. Whenever the output voltage Vout drops below the reference voltage, a new switching cycle is started.

Figure 2:
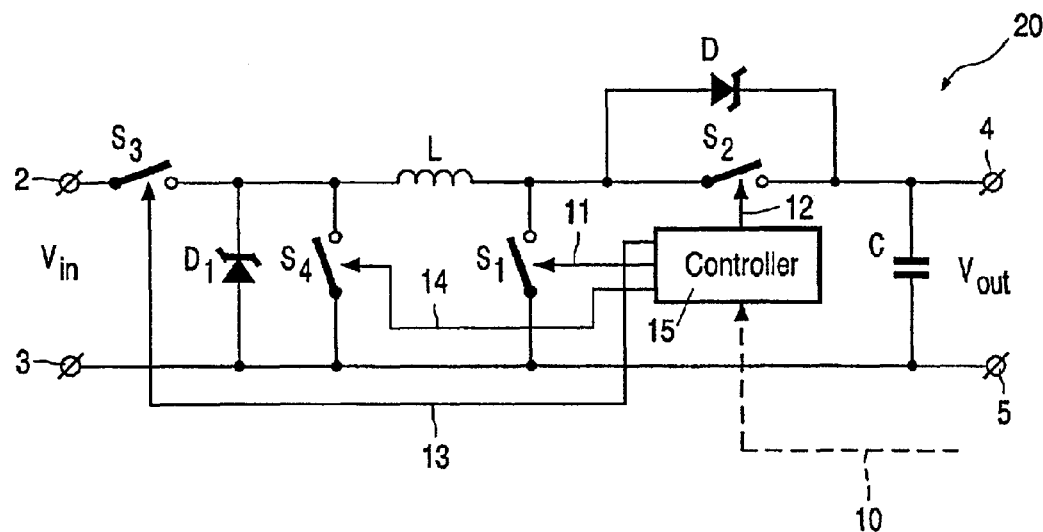
FIG. 2 shows a circuit diagram of a prior art DC/DC up/down converter.

FIG. 2 shows a circuit diagram of an implementation of a prior art DC/DC up/down converter 20, based on the up-converter 1. In addition to the up-converter 1 as shown in FIG. 1, the up/down converter 20 comprises additional third switching means S3, by which the first connection end of the coil L connects to the first input terminal 2, and fourth switching means S4 connecting the first connection end of the coil L to the first input terminal 3 of the converter 20. Further, first diode means D1 are parallel connected to the fourth switching means S4, providing a conduction path in forward direction from the second output terminal 5 to the first connection end of the coil L. Control means 15 are provided for controlling the switching means S1, S2, S3 and S4 as indicated by arrows 11, 12, 13 and 14, respectively.

In a typical conversion cycle of the converter 20, during a first phase, the first switching means S1 and the third switching means S3 are in a conductive state and the second switching means S2 and the fourth switching means S4 are in a non-conductive state. During this first phase, energy is stored in the coil L.

In a second phase of the switching cycle, the first switching means S1 and the fourth switching means S4 are in a non-conductive state and the second switching means S2 and the third switching means S3 are in a conductive state. During this phase, the coil current remains stable and energy is transferred to the output terminals 4, 5, resulting in an output voltage Vout.

In a third phase, the first switching means S1 and the third switching means S3 are in a non-conductive state and the second switching means S2 and the fourth switching means S4 are in a conductive state. In this phase, the coil current decreases, because no energy is supplied thereto from the input, while energy is transferred to the output.

By controlling the amount of energy supplied to the coil L, the output voltage Vout can be higher than the input voltage Vin, i.e. the up-conversion mode, or the output voltage Vout can be less than the input voltage Vin, i.e. the down-conversion mode of the converter 20.

Figure 3:
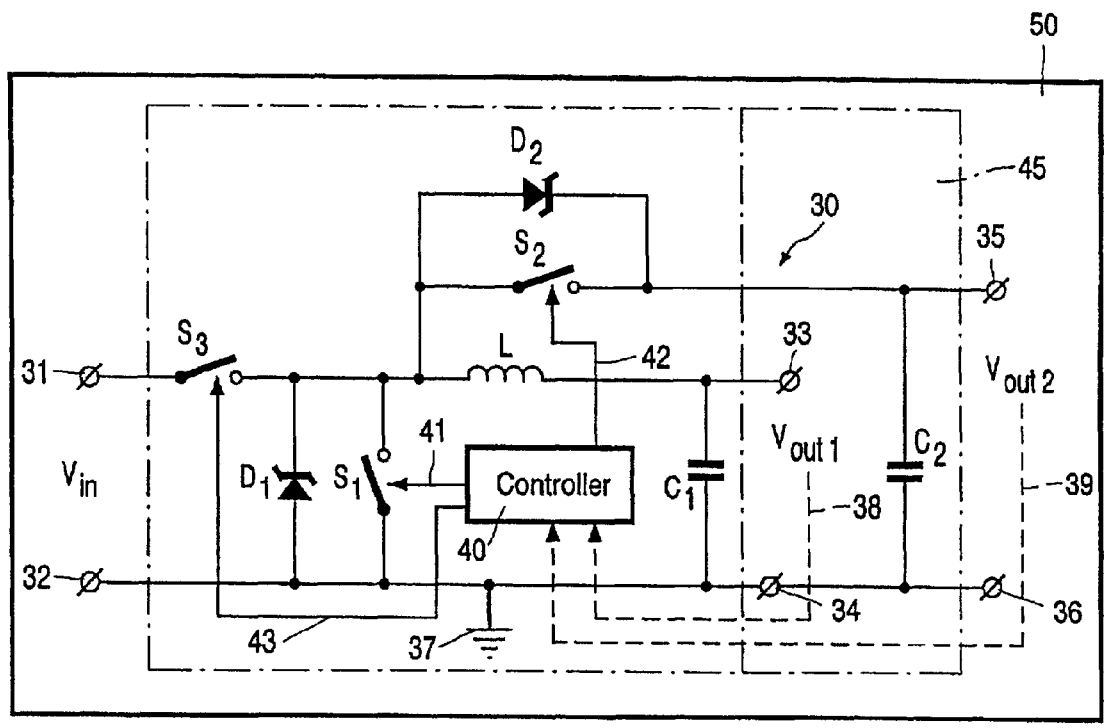
FIG. 3 shows a circuit diagram of the DC/DC up/down converter according to the present invention.

FIG. 3 shows a preferred embodiment of the DC/DC up/down converter 30 according to the present invention, having an input comprised by first and second input terminals 31, 32, a first output comprised by first and second output terminals 33, 34 and a second output comprised by third and fourth output terminals 35, 36. The second input terminal 32 and the second and fourth output terminals 34, 36 connect to a common conduction path, such as the earth or mass 37 of an electronic appliance 50.

The converter 30 according to the invention likewise comprises energy storage means in a form of a coil L, having a first connection end which connects via first switching means S1 to the second and fourth output terminals 34, 36. A second connection end of the coil L connects to the first output terminal 33. The first connection end of the coil L connects via second switching means S2 to the third output terminal 35 and via switching means S3 to the first input terminal 31. As disclosed in connection with the up/down converter of FIG. 2, first diode means D1 connect parallel to the first switching means S1 and second diode means D2 connect parallel to the second switching means S2. Smoothing capacitors C1 and C2 connect between the output terminals 33, 34 and 34, 35, respectively. The second switching means S2 are optional and are used to increase the power conversion efficiency of the DC/DC convertor.

Control means 40 are arranged for measuring the output voltage Vout1 at the first output, schematically indicated by a dashed arrow 38, and for measuring the output voltage Vout2 at the second output, schematically indicated by a dashed arrow 39. Control of the first S1, second S2, and third switching means S3 by the control means 40 is schematically indicated by arrows 41, 42 and 43, respectively.

Figure 4:
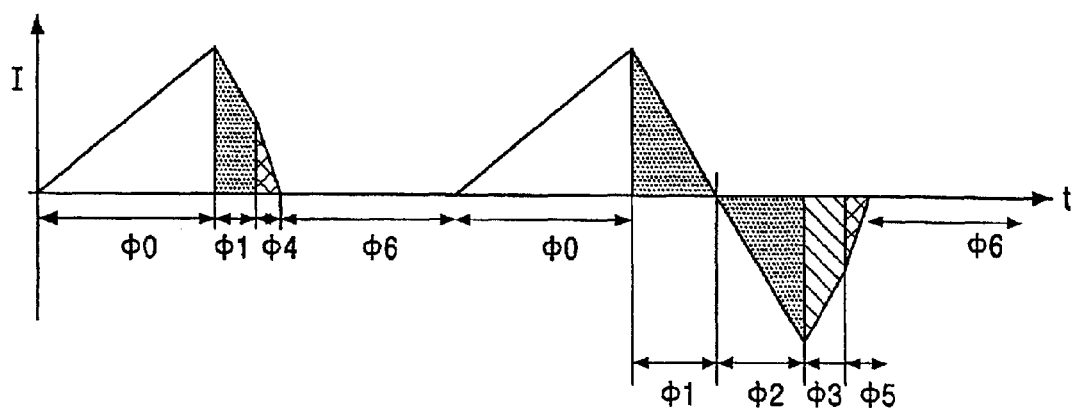
FIG. 4 shows, in a graphic representation, the coil current in the DC/DC up/down converter as shown in FIG. 2.

The operation of the multi-output DC/DC up/down converter 30 according to the present invention can be best illustrated with reference to FIG. 4, wherein the coil current I against the time t is depicted, in a typical switching cycle in PFM mode or discontinues mode, wherein the current I through the coil L becomes zero. A typical switching cycle comprises seven different phases:

$\Phi 0$: the switching means S3 are in a conductive or closed state and the switching means S1 and S2 are in a non-conductive or open state, such that energy from an input voltage source, providing an input voltage Vin, is stored in the coil L and transferred to the first output resulting in an output voltage Vout1.

$\Phi 1$: the switching means S1 are closed and the switching means S2 and S3 are open, such that energy in the coil L is transferred to the first output.

$\Phi 2$: the switching means S1 are closed and the switching means S2 and S3 are open, such that energy is transferred from the first output to the coil L. The current in the coil L flows in opposite direction compared to $\Phi 0$ and $\Phi 1$.

Φ3: the switching means S2 are closed and the switching means S1 and S3 are open, wherein energy from the coil L and from the first output 1 is transferred to the second output 2, resulting in an output voltage Vout2.

Φ4: all switches are open, such that the remaining energy in the coil L is transferred to the first output via the diode D1.

Φ5: all switches are open, such that the remaining energy in the coil L is transferred to the second output. Current flow I in the coil L is in opposite direction compared to phase Φ4.

Φ6: all switches are open, the current I through the coil is zero.

It will be appreciated that the control means 40 control the switching means S1, S2 and S3 in accordance with desired output voltages Vout1 and Vout2, by measuring same with respect to reference voltages Vref1 and Vref2 (not shown), however such that Vout1<Vin and Vout2>Vout1.

By comparing the DC/DC up/down converters of FIGS. 2 and 3, it can be seen that the converter 30 according to the invention is realised with one switch less than the prior art converter 20. In a case of semiconductor transistor switching means, such as Metallic Oxide Semiconductor (MOS) transistors, it will be appreciated that the switching loss and overall series resistance of the converter 30 according to the invention are reduced compared to the prior art converter 20. In the case of an integrated circuit converter, the converter 30 according to the invention requires less chip area compared to the converter 20, because of the reduced number of switching means.

The DC/DC up/down converter operating in accordance with the principles of the present invention, may be used in an electronic appliance 50, such as a portable electric appliance, or arranged to form a separate power supply, schematically indicated by a dashed-dotted block 45 in FIG. 3.

We claim:

1. A DC/DC up/down converter (30), comprising a dual-path inductive energy storage means, switching means (S1, S2, S3) and control means (40), wherein said control means (40) are arranged for selectively operating said switching means (S1, S2, S3) for transferring an amount of electrical energy from said energy storage means (L) to an output of said DC/DC converter (30), characterized in that said control means (40) are configured for operatively controlling said switching means (S1, S2, S3) for transferring electrical energy to a first output (Vout1) of said DC/DC converter (30) in a down-conversion mode and for transferring electrical energy from said first output (Vout1) to a second output (Vout2) of said DC/DC converter (30) in an up-conversion mode.

2. A DC/DC up/down converter (30) according to claim 1, comprising:
   first and second input terminals (31, 32);
   first and second output terminals (33, 34);
   third and fourth output terminals (35, 36);
   a coil (L), having first and second connection ends, wherein said second connection end connects to said first output terminal (33);
   first switching means (S1) operatively connected to provide a conduction path from said first connection end of said coil (L) to said second input terminal (32);
   second switching means (S2) operatively connected to provide a conduction path from said first connection end of said coil (L) to said third output terminal (35);
   third switching means (S3) operatively connected to provide a conduction path from said first input terminal (31) to said first connection end of said coil (L);
   first diode means (D1) parallel connected to said first switching means (S1), and providing a conduction path from said fourth output terminal (36) to said first connection end of said coil (L), and
   second diode means (D2) parallel connected to said second switching means (S2), and providing a conduction path from said first connection end of said coil (L) to said second output terminal (35); and
   control means (40) arranged for operatively switching said first, second and third switching means (S1, S2, S3) into their closed or conductive state and open or non-conductive state.

3. A DC/DC up/down converter (30) according to claim 2, wherein said control means (40) are arranged for controlling said switching means (S1, S2, S3) in a conversion cycle comprising:
   a first phase (Φ0) wherein said third switching means (S3) are in a conductive state and said first and second switching means (S1, S2) are in a non-conductive state;
   a second phase (Φ1) wherein said first switching means (S1) are in a conductive state and said second and third switching means (S2, S3) are in a non-conductive state;
   a third phase (Φ2) wherein said first switching means (S1) are in a conductive state and said second and third switching means (S2, S3) are in a non-conductive state;
   a fourth phase (Φ3) wherein said second switching means (S2) are in a conductive state and said first and third switching means (S1, S3) are in a non-conductive state, and wherein current flow (I) in said coil (L) is in opposite direction compared to said second phase (Φ1);
   a fifth phase (Φ4) wherein said first, second and third switches (S1, S2, S3) are in a non-conductive state;
   a sixth phase (Φ5) wherein said first, second and third switches (S1, S2, S3) are in a non-conductive state and current flow (I) in said coil (L) is in opposite direction compared to said fifth phase (Φ4), and
   a seventh phase (Φ6) wherein said first, second and third switches (S1, S2, S3) are in a non-conductive state and wherein no current flows through said coil (L).

4. A DC/DC up/down converter (30) according to claim 2, wherein said switching means (S1, S2, S3) comprise semiconductor switching means, in particular MOS (Metallic Oxide Semiconductor) transistor means.

5. A DC/DC up/down converter (30) according to claim 2, further comprising capacitors (C1;C2) parallel connected to said first and second output terminals (33, 34) and said third and fourth output terminals (35, 36).

6. A power supply (45) comprising a DC/DC up/down converter (30) according to claim 1, arranged for receiving a DC input voltage Vin at its input, and wherein said control means (40) are arranged for transferring an amount of electrical energy from said input to said energy storage means (L), such that during use said first output of said DC/DC converter (30) provides a voltage Vout1 and said second output of said DC/DC converter (30) provides a voltage Vout2, wherein Vout1<Vin and Vout2>Vout1.

7. A portable electronic appliance (50) comprising a DC/DC up/down converter (30) according to claim 1.

* * * * *